(12) United States Patent
Fan

(10) Patent No.: US 9,810,830 B2
(45) Date of Patent: Nov. 7, 2017

(54) BACKLIGHT MODULE

(71) Applicant: Shenzhen China Star Optoelectronics Technology Co., Ltd., Guangdong (CN)

(72) Inventor: Yong Fan, Guangdong (CN)

(73) Assignee: SHENZHEN CHINA STAR OPTOELECTRON ICS TECHNOLOGY CO., LTD., Guangdong (CN)

( * ) Notice: Subject to any disclaimer, the term of this patent is extended or adjusted under 35 U.S.C. 154(b) by 74 days.

(21) Appl. No.: 14/895,965

(22) PCT Filed: Aug. 14, 2015

(86) PCT No.: PCT/CN2015/086935
§ 371 (c)(1),
(2) Date: Dec. 4, 2015

(87) PCT Pub. No.: WO2017/015994
PCT Pub. Date: Feb. 2, 2017

(65) Prior Publication Data
US 2017/0168225 A1 Jun. 15, 2017

(30) Foreign Application Priority Data
Jul. 30, 2015 (CN) .......................... 2015 1 0460477

(51) Int. Cl.
*F21V 7/04* (2006.01)
*F21V 8/00* (2006.01)

(52) U.S. Cl.
CPC ........... *G02B 6/0078* (2013.01); *G02B 6/002* (2013.01); *G02B 6/0051* (2013.01); *G02B 6/0055* (2013.01); *G02B 6/0088* (2013.01); *G02B 6/008* (2013.01); *G02B 6/009* (2013.01)

(58) Field of Classification Search
CPC .... G02B 6/0078; G02B 6/002; G02B 6/0051; G02B 6/0055; G02B 6/0088; G02B 6/009; G02B 6/0043; G02B 6/008; B60Q 1/0011
See application file for complete search history.

(56) References Cited

U.S. PATENT DOCUMENTS

2005/0276075 A1* 12/2005 Chen et al. .......... G02B 6/0021
362/615
2010/0045898 A1* 2/2010 Lee et al. ............... G02B 6/008
362/97.3

(Continued)

*Primary Examiner* — Y M. Lee
(74) *Attorney, Agent, or Firm* — Brooks Kushman P.C.

(57) ABSTRACT

A backlight module including a back plate which includes a flat plate, first and second wedges respectively formed at both ends of the flat plate, and a plurality of third wedges formed between the first and second wedges on the flat plate, wherein an angle between a long inclined plane of the first wedge and a flat plate, an angle between a long inclined plane of the second wedge and a flat plate, and an angle between an inclined plane of the third wedge and the flat plate are obtuse angle, acute angle and acute angle respectively; a first light source assembly disposed on the first wedge; a second light source assembly disposed on the second wedge; and a plurality of third light source assemblies, wherein each third light source assembly is disposed on the corresponding third wedge.

9 Claims, 1 Drawing Sheet

(56) References Cited

U.S. PATENT DOCUMENTS

2011/0211141 A1* 9/2011 Cho .................. G02B 6/002
                                              349/61
2011/0267563 A1* 11/2011 Shimizu ............. G02B 6/0088
                                              362/606

* cited by examiner

BACKLIGHT MODULE

CROSS-REFERENCE TO RELATED APPLICATION

This application is the U.S. national phase of PCT Application No. PCT/CN015/086935 filed on Aug. 14, 2015, which claims priority to CN Patent Application No. 201510460477.2 filed on Jul. 30, 2015, the disclosures of which are incorporated in their entirety by reference herein.

FIELD OF THE INVENTION

The present invention relates to a liquid crystal display technical field, and more particularly, to a backlight module of a liquid crystal display.

BACKGROUND OF THE INVENTION

In a conventional thin film transistor liquid crystal display (TFT-LCD), since a liquid crystal panel of the TFT-LCD itself does not emit light, displaying can be performed by means of an external light source. Generally, the external light source includes a backlight-type light source and a reflective-type light source. Since the backlight-type light source is unnecessarily affected by environmental changes, the light sources of the current TFT-LCDs are almost backlight-type light sources.

In the TFT-LCDs, the light sources have experienced two types, i.e., from CCFL (cold cathode fluorescent lighting) to LED (light emitting diode). At present, the LED has become a main light source of the TFT-LCD because of its advantages of small volume, rapid time response, long service life, unbreakable, high color gamut, a variety of capsules and so on.

Currently, a LED backlight module basically includes an edge-type LED backlight module and a direct-type LED backlight module. The edge-type LED backlight module has merits of low power consumption and thin thickness, but since it has to use a light guide plate, it is heavy and its cost is high. The direct-type LED backlight module uses a small number of light sources without using a light guide plate, thus, its cost is low; but its light box is relatively high, thus, it looks thicker in appearance.

Quantum Dot (QD) phosphor is a phosphor that may achieve the highest color saturation among current phosphors, because its color purity is extremely high due to a relatively narrow FWHM (Full Width at Half Maximum) of its luminescent spectrum (i.e., merely 20 to 40 nm). However, since the QD phosphor is synthesized using chemical solutions, it is difficult to be uniformly dispersed in silicone, and it is afraid of water and oxygen and has serious thermal quenching in luminescence. Thus, if the QD phosphor is directly encapsulated in the LED, the LED will be caused to have low brightness and bad endurance, and it is difficult to achieve batch production at present.

At present, all methods of achieving batch production of the QD phosphor adopt remote phosphor solutions, one of which is to adopt a sandwich structure, that is, the QD phosphor is encapsulated in an optical film, and then it is used in cooperation with other optical films; and the other one is to encapsulate the QD phosphor in a glass tube to form a QD tube, wherein the QD is placed in the front of the LED and fixed using a support device when it is used.

However, currently, the optical film encapsulated with the QD phosphor cannot be made oversized (e.g., larger than 100 inches) due to a limitation of a cabinet, thus, the oversized application is limited. The QD tube may be merely used in the edge-type backlight module, and it is easily breakable, thereby having a low reliability.

Thus, in a current oversized LCD, since the size is large, a transmittance of a liquid crystal panel is low, the brightness is required to be high (i.e., at least 1000 nits), and a color gamut is demanded to be high (i.e., more than 92%), it is difficult to apply the QD technique to the oversized LCD by adopting current conventional design means.

SUMMARY OF THE INVENTION

In order to solve the above problem existing in prior art, an object of the present invention is to provide a backlight module including: a back plate which includes a flat plate, first and second wedges respectively formed at both ends of the flat plate, and a plurality of third wedges formed between the first and second wedges on the flat plate, wherein the first and second wedges have heights greater than heights of the third wedges; a first light source assembly disposed on the first wedge; a second light source assembly disposed on the second wedge; and a plurality of third light source assemblies, wherein each of the third light source assemblies is disposed on the corresponding third wedge.

Furthermore, a side end of the first wedge that is adjacent to the third wedge and thick side ends of the third wedges are all concave to form grooves.

Furthermore, the third light source assembly includes: a third light source unit disposed in the corresponding groove, and a third light guide plate disposed on the third wedge adjacent to the third light source unit.

Furthermore, a side end of the third light guide plate that is far away from the third light source unit has a reflective element.

Furthermore, the third light guide plate is locked and fixed to the third wedge via a screws.

Furthermore, the third light guide plate is provided with a support pillar thereon.

Furthermore, a side end of the first wedge that is far away from the third wedge extends upward to form a first U-shaped cavity of which an opening faces towards the second wedge.

Furthermore, the first light source assembly includes: a first light source unit disposed in the first U-shaped cavity, and a first light guide plate disposed on the first wedge.

Furthermore, a side end of the first light guide plate that is far away from the first light source unit has a reflective element.

Furthermore, the first light guide plate is locked and fixed to the first wedge via a screw.

Furthermore, the first light guide plate is provided with a support pillar thereon.

Furthermore, a side end of the second wedge that is far away from the third wedge extends upward to form a second U-shaped cavity of which an opening faces towards the first wedge.

Furthermore, the second light source assembly includes: two second light source units and two second light guide plates, wherein one of the two second light source units is disposed in the second U-shaped cavity, the other one of the two second light source units is disposed in the groove adjacent to the second wedge, and two light guide plates are disposed on the second wedge in a butt joint way.

Furthermore, the second light guide plate is locked and fixed to the second wedge via a screw.

Furthermore, one of the two second light guide plates is provided with a support pillar thereon.

The advantageous effects of the present invention are as follows: the backlight module of the present invention may apply the QD technique to the oversized LCD (e.g., larger than 100 inches).

BRIEF DESCRIPTION OF THE DRAWINGS

Above and/or other aspects, features and advantages of the embodiments of the present invention will become more apparent from the following description, taken in conjunction with the accompanying drawings in which.

DETAILED DESCRIPTION OF THE INVENTION

Figure 1:
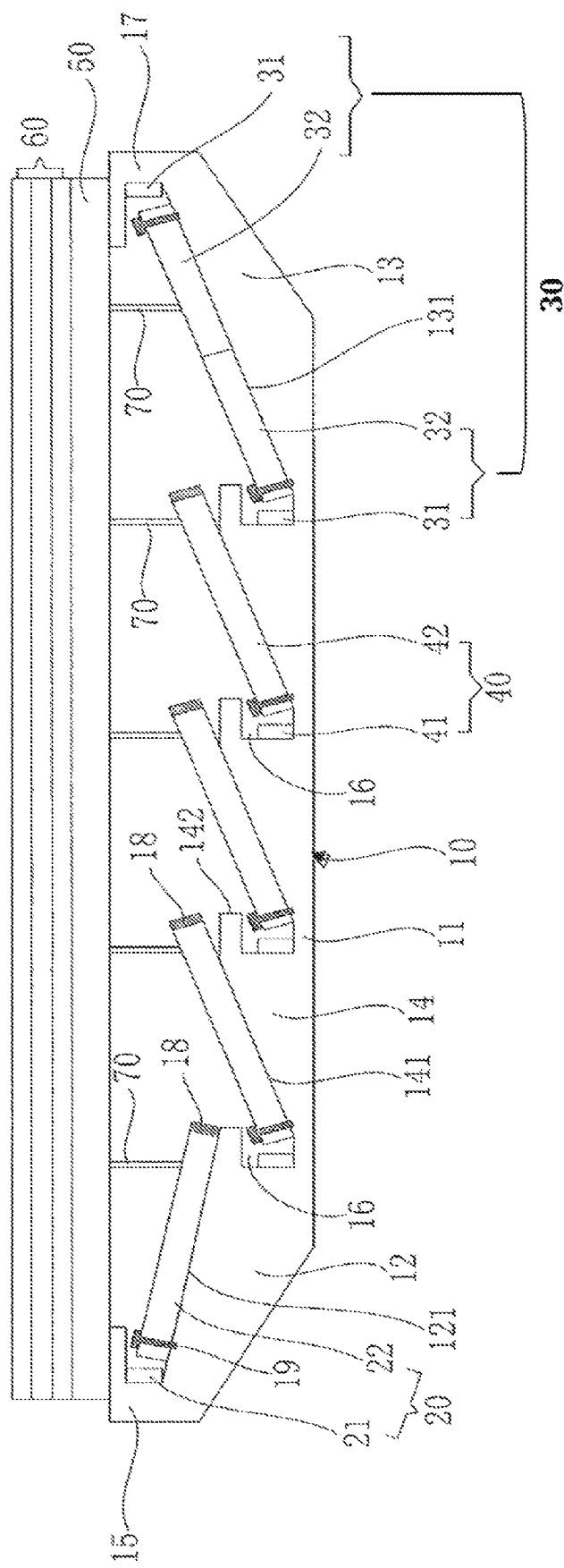
FIG. 1 is a side view schematic diagram illustrating a backlight module according to an embodiment of the present invention.

Embodiments of the present invention will be described in detail below by referring to the accompany drawings. However, the present invention can be implemented in many different forms, and the present invention should not be construed as being limited to the specific embodiments set forth herein. Rather, these embodiments are provided so as to explain the principle and actual application of the present invention, thus other skilled in the art can understand various embodiments and amendments which are suitable for specific intended applications of the present invention.

In the drawings, thicknesses of layers and regions are exaggerated for the sake of clarity. The same reference numerals refer to like elements in the entire description and drawings.

It should be understood that, although the terms "first", "second" and "third" may be used to describe various elements herein, these elements should not be limited by these terms. These terms are merely used to distinguish one element from another one.

FIG. 1 is a side view schematic diagram illustrating a backlight module according to an embodiment of the present invention.

By referring to FIG. 1, the backlight module according to the embodiment of the present invention includes: a back plate 10 which includes a flat plate 11, first and second wedges 12, 13 respectively formed at both ends of the flat plate 11, and a plurality of third wedges 14 formed between the first and second wedges 12, 13 on the flat plate 11; a first light source assembly 20 disposed on the first wedge 12; a second light source assembly 30 disposed on the second wedge 13; a plurality of third light source assemblies 40 of which each is disposed on the corresponding third wedge 14; a diffusion plate 50 disposed on the first wedge 12 and the second wedge 13; a plurality of optical films 60 sequentially disposed on the diffusion plate 50.

It should be explained that the backlight module 1 according to the embodiment of the present invention may further include other suitable types of components, such as a plastic frame and so on.

In the present embodiment, the first wedge 12 is adjacent to the leftmost third wedge 14. Here, furthermore, a side end of the first wedge 12 that is far away from the leftmost third wedge 14 extends upward to form a first U-shaped cavity 15 of which an opening faces towards the second wedge 13 (i.e., the opening faces the right). Furthermore, a side end of the first wedge 12 that is adjacent to the leftmost third wedge 14 is concave to from a groove 16. Functions of the first U-shaped cavity 15 will be indicated below.

The second wedge 13 is adjacent to the rightmost third wedge 14. Here, furthermore, a side end of the second wedge 13 that is far away from the rightmost third wedge 14 extends upward to form a second U-shaped cavity 17 of which an opening faces towards the first wedge 12 (i.e., the opening faces towards the left). Functions of the second U-shaped cavity 17 will be indicated below.

In the present embodiment, the third wedge 14 is in right trapezoid in its entirety, and an angle between its inclined plane 141 and the flat plate 11 is an acute angle, which does not exceed 10°. However, the present invention is not limited thereto. Furthermore, a vertical plane 142 of the third wedge 14 (i.e., a thick side end of the third wedge 14) is concave to from a groove 16. Functions of the groove 16 will be indicated below.

In addition, in the present embodiment, an angle between a long inclined plane 121 of the first wedge 12 and the flat plate 11 is an obtuse angle, and an angle between a long inclined plane 131 of the second wedge 13 and the flat plate 11 is an acute angle, in which the angle between the long inclined plane 121 of the first wedge 12 and the flat plate 11 and the angle between the long inclined plane 131 of the second wedge 13 and the flat plate 11 are complementary, and the angle between the long inclined plane 131 of the second wedge 13 and the flat plate 11 is greater than the angle between the inclined plane 141 of the third wedge 14 and the flat plate 11, so that the heights of the first wedge 12 and the second wedge 13 both are greater than the heights of the third wedges 14. However, the present invention is not limited thereto. For example, if the angle between the long inclined plane 131 of the second wedge 13 and the flat plate 11 is equal to the angle between the inclined plane 141 of the third wedge 14 and the flat plate 11, it has to make the heights of the first wedge 12 and the second wedge 13 greater than the heights of the third wedges 14 through other suitable means.

In addition, since the angle between the long inclined plane 121 of the first wedge 12 and the flat plate 11 and the angle between the long inclined plane 131 of the second wedge 13 and the flat plate 11 are complementary, a normal direction of the long inclined plane 121 of the first wedge 12 and a normal direction of the long inclined plane 131 of the second wedge 13 are axial symmetric about a normal direction of the flat plate 11.

Continuing to refer to FIG. 1, the first light source assembly 20 includes: a first light source unit 21 disposed in the first U-shaped cavity 15, and a first light guide plate 22 disposed on the long inclined plane 121 of the first wedge 12, so that the first light source unit 21 is adjacent to one side end of the first light guide plate 22.

Furthermore, the other side end of the first light guide plate 22 (i.e., a side end of the first light guide plate 22 that is far away from the first light source unit 21) has a reflective element 18. In the present embodiment, the first light source unit 21 may include a LED and a QD glass tube adjacent to the LED (i.e., disposed between the LED and one side end of the first light guide plate 22). However, the present invention is not limited thereto. For example, the first light source unit 21 may be just a LED.

Furthermore, the first light guide plate 22 is locked and fixed to the long inclined plane 121 of the first wedge 12 via a screw 19. However, the present invention is not limited thereto. For example, the first light guide plate 22 may be fixed to the long inclined plane 121 of the first wedge 12 through other suitable types of fixing manners. In addition, furthermore, the first light guide plate 22 is provided with a support pillar 70 thereon. Functions of the support pillar 70 will be indicated below.

Continuing to refer to FIG. 1, the second light source assembly 30 includes: two second light source units 31 and two second light guide plates 32, in which one of the two second light source units 31 is disposed in the second U-shaped cavity 17, the other one of the two second light source units 31 is disposed in the groove 16 of the rightmost third wedge 14 (i.e., the groove 16 adjacent to the second wedge 13), and two light guide plates 32 are disposed on the long inclined plane 131 of the second wedge 13 in a butt joint way, so that the two second light source units 31 are adjacent to two side ends of the second light guide plate 32, respectively. In other embodiments of the present invention, the above two light guide plates 32 may be replaced with a light guide plate having a length two times longer than the length of the light guide plate 32.

In addition, a side end of the light guide plate 32 adjacent to the other one of the two second light source units 31, which faces towards the second light source unit 31, is disposed in the groove 16 of the rightmost third wedge 14, and the side end facing towards the second light source unit 31 is adjacent to the other one of the two second light source units 31.

In the present embodiment, the second light source unit 31 may include a LED and a QD glass tube adjacent to the LED (i.e., disposed between the LED and one side end of the second light guide plate 32). However, the present invention is not limited hereto. For example, the second light source unit 31 may be just a LED.

Furthermore, each second light guide plate 32 is locked and fixed to the long inclined plane 131 of the second wedge 13 via a screw 19. However, the present invention is not limited thereto. For example, the second light guide plate 32 may be fixed to the long inclined plane 131 of the second wedge 13 through other suitable types of fixing manners. In addition, furthermore, one of the two second light guide plates 32 is provided with a support pillar 70 thereon. Functions of the support pillar 70 will be indicated below.

Continuing to refer to FIG. 1, each of the third light source assemblies 40 includes: a third light source unit 41 disposed in a corresponding groove 16 (here, the corresponding groove 16 refers to any one of the grooves other than the groove 16 adjacent to the second wedge 13), and a third light guide plate 42 disposed on the inclined plane 141 of the third wedge 14 adjacent to the third light source unit 41, so that the third light source unit 41 is adjacent to one side end of the third light guide plate 42. In the present embodiment, the third wedge 42 may have a length greater than the length of the inclined plane 141 of the third wedge 14. However, the present invention is not limited thereto. In addition, one side end of the third light guide plate 42 may also be disposed in the corresponding groove 16 and adjacent to the third light source unit 41. However, the present invention is not limited thereto.

Furthermore, the other side end of the third light guide plate 42 (i.e., a side end of the third light guide plate 42 that is far away from the third light source unit 41) has a reflective element 18. In the present embodiment, the third light source unit 41 may include a LED and a QD glass tube adjacent to the LED (i.e., disposed between the LED and one side end of the third light guide plate 41). However, the present invention is not limited thereto. For example, the third light source unit 41 may be just a LED.

Furthermore, the third light guide plate 42 is locked and fixed to the slope 141 of the third wedge 14 via a screw 19. However, the present invention is not limited thereto. For example, the third light guide plate 42 may be fixed to the inclined plane 141 of the third wedge 14 through other suitable types of fixing manners. In addition, furthermore, the third light guide plate 42 is provided with a support pillar 70 thereon. Functions of the support pillar 70 will be indicated below.

Continuing to refer to FIG. 1, the diffusion plate 50 is disposed on the first U-shaped cavity 15 and the second U-shaped cavity 17. The support pillars 70 function to support the diffusion plate 50 and ensure that there is a proper distance for light mixing between each light guide plate and the diffusion plate 50, after the diffusion plate 50 is disposed on the first U-shaped cavity 15 and the second U-shaped cavity 17.

In addition, in the present embodiment, the reflective element 18 may be for example a reflective film layer, such as a metal film layer or a media film layer having high reflectance, and the present invention will not make specific definitions.

In summary, the backlight module according to the embodiment of the present invention may apply the QD technique to the oversized LCD (e.g., larger than 100 inches).

Although the present invention is described with reference to the specific exemplary embodiments, it should be understood by those skilled in the art that various changes in form and details may be made therein without departing from the spirit and scope of the invention as defined by the appended claims and its equivalents.

What is claimed:

1. A backlight module comprising:
a back plate which includes a flat plate, first and second wedges respectively formed at both ends of the flat plate, and a plurality of third wedges formed between the first and second wedges on the flat plate, wherein an angle between a long inclined plane of the first wedge and the flat plate is an obtuse angle, an angle between a long inclined plane of the second wedge and the flat plate is an acute angle, and an angle between the inclined plane of the third wedge and the flat plate is an acute angle, wherein a side end of the first wedge that is adjacent to the third wedge and a thick side end of the third wedge are all concave to form grooves, and wherein a side end of the second wedge that is far away from the third wedge extends upward to form a second U-shaped cavity of which an opening faces towards the first wedge;
a first light source assembly disposed on the first wedge;
a second light source assembly disposed on the second wedge and comprising two second light source units and two second light guide plates, wherein one of the two second light source units is disposed in the second U-shaped cavity, the other one of the two second light source units is disposed in a groove formed by a thick side end of the adjacent third wedge, and two light guide plates are disposed on the second wedge in a butt joint way and one of the second light guide plates is provided with a support pillar thereon; and
a plurality of third light source assemblies, wherein each of the third light source assemblies is disposed on the corresponding third wedge and comprises a third light source unit disposed in the corresponding groove and a third light guide plate disposed on the third wedge adjacent to the third light source unit.

2. The backlight module of claim 1, wherein a side end of the third light guide plate that is far away from the third light source unit has a reflective element.

3. The backlight module of claim 1, wherein the third light guide plate is locked and fixed to the third wedge via a screw.

4. The backlight module of claim 1, wherein a side end of the first wedge that is far away from the third wedge extends upward to form a first U-shaped cavity of which an opening faces towards the second wedge; and the first light source assembly comprises: a first light source unit disposed in the first U-shaped cavity, and a first light guide plate disposed on the first wedge.

5. The backlight module of claim 4, wherein a side end of the first light guide plate that is far away from the first light source unit has a reflective element.

6. The backlight module of claim 4, wherein the first light guide plate is locked and fixed to the first wedge via a screw.

7. The backlight module of claim 1, wherein the second light guide plate is locked and fixed to the second wedge via a screw.

8. The backlight module of claim 1, wherein the third light guide plate is provided with a support pillar thereon.

9. The backlight module of claim 4, wherein the first light guide plate is provided with a support pillar thereon.

* * * * *